US012729350B1

(12) United States Patent
Battle, III

(10) Patent No.: US 12,729,350 B1
(45) Date of Patent: Sep. 8, 2026

(54) LIQUID DETERGENT CONCENTRATE COMPRISING AN AMPHOTERIC/NONIONIC TERNARY SURFACTANT MIXTURE FOR USE IN REMOVING PERFLUORINATED POLYETHERS (PFPEs) FROM PARTS

(71) Applicant: United States of America as represented by the Administrator of NASA, Washington, DC (US)

(72) Inventor: William Dudley Battle, III, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 189 days.

(21) Appl. No.: 18/882,422

(22) Filed: Sep. 11, 2024

(51) Int. Cl.
*C11D 1/94* (2006.01)
*C11D 1/835* (2006.01)
*C11D 3/08* (2006.01)

(52) U.S. Cl.
CPC ................ *C11D 3/08* (2013.01); *C11D 1/835* (2013.01)

(58) Field of Classification Search
CPC .... C11D 1/72; C11D 1/75; C11D 1/88; C11D 3/08; C11D 2111/20
See application file for complete search history.

(56) References Cited

U.S. PATENT DOCUMENTS

| | | | | |
|---|---|---|---|---|
| 2008/0221006 | A1 * | 9/2008 | Heisig | C11D 3/48 510/245 |
| 2021/0029998 | A1 * | 2/2021 | Konya | C11D 3/30 |
| 2021/0032574 | A1 * | 2/2021 | Konya | A01N 43/40 |
| 2022/0174949 | A1 * | 6/2022 | Hayward | A01N 25/10 |

* cited by examiner

*Primary Examiner* — Charles I Boyer
(74) *Attorney, Agent, or Firm* — Jerry L. Seemann; Trenton J. Roche

(57) ABSTRACT

A liquid detergent concentrate has detergent builders that consist of sodium metasilicate pentahydrate and liquid sodium silicate, surfactants that consist of octyldimethylamine oxide, octyl iminodipropionate, and an alcohol ethoxylate having a hydrophilic-lipophilic balance (HLB) in a range of 10-12, and deionized water having a resistivity of at least 50,000 ohms.

14 Claims, No Drawings

LIQUID DETERGENT CONCENTRATE COMPRISING AN AMPHOTERIC/NONIONIC TERNARY SURFACTANT MIXTURE FOR USE IN REMOVING PERFLUORINATED POLYETHERS (PFPEs) FROM PARTS

ORIGIN OF THE INVENTION

The invention described herein was made in the performance of work under a NASA contract and is subject to the provisions of Public Law 96-517 (35 U.S.C. § 202) in which the Contractor has elected not to retain title.

BACKGROUND OF THE INVENTION

1. Field of the Invention

This disclosure relates to detergents. More specifically, the disclosure describes a liquid detergent concentrate that may be used in an aqueous solution to remove perfluorinated polyethers (PFPEs) from parts such as those used in the aerospace industry.

2. Description of the Related Art

Perfluorinated polyethers (PFPEs) such as KRYTOX are used as a lubricant in many aerospace applications. From time-to-time, it may be necessary to clean (metal) parts lubricated with PFPEs. Currently, there are only a few organic solvents that can remove PFPE but they are very expensive and ineffective at removing most other contaminants. This generally results in the use of multiple cleaning systems which may require the use of multiple facilities to clean the parts thereby adding to the cost of cleaning the parts. While there have been some detergents capable of removing PFPEs as well as other greases, oils, soils, etc., the negative environmental impact of these detergents has resulted in their removal from the market in accordance with government regulatory restrictions.

SUMMARY OF THE INVENTION

Accordingly, it is an object of the present disclosure to describe a detergent that may be used to effectively remove PFPEs from metals.

Another object of the present disclosure is to describe a detergent that may be used to remove PFPEs as well as a variety of other lubricants and contaminants from metals.

Still another object of the present disclosure is to describe an environmentally safe detergent that may be used to remove PFPEs from items such as aerospace parts.

Other objects and advantages of the methods and systems described herein will become more obvious hereinafter in the specification and drawings.

In accordance with the present disclosure, a liquid detergent concentrate has detergent builders, surfactants, and deionized water. The detergent builders consist of sodium metasilicate pentahydrate and liquid sodium silicate. The surfactants consist of octyldimethylamine oxide, octyl iminodipropionate, and an alcohol ethoxylate having a hydrophilic-lipophilic balance (HLB) in a range of 10-12. The deionized water has a resistivity of at least 50,000 ohms.

DESCRIPTION OF THE PREFERRED EMBODIMENT(S)

The present disclosure will describe a liquid detergent concentrate that may be mixed with water to create an environmentally-safe aqueous cleaning solution. Briefly, an aqueous cleaning solution that includes the herein-described liquid detergent concentrate may be used to clean perfluorinated polyethers (PFPEs) as well as grease, oil, dirt, and other contaminants from the surfaces of a variety of metal or metal alloy parts such as those found in aerospace applications. The metals or metal alloys that may be cleaned include, but are not limited to, steel, brass, aluminum, titanium, copper, nickel, cobalt, tin, bronze, tungsten, commercially-available superalloys such as INCONEL and HASTALLOY, and a family of copper alloys known as GRCop developed by the National Aeronautics and Space Administration (NASA).

The liquid detergent concentrate includes detergent builders, surfactants, and deionized water. Exemplary formulations to be described herein have been included in an aqueous cleaning solution that effectively removes PFPEs as well as other surface contaminants from metal or metal alloy part surfaces. In addition, it has been found that the concentrate's formulations described herein need only comprise approximately 3-5 volume percent of the aqueous cleaning solution in order to create an effective cleaner. The aqueous cleaning solution may be sprayed, used in a wash tank, or used in accordance with other cleaning methodologies, without departing from the scope of the present invention.

The detergent builders used in the liquid detergent concentrate are sodium metasilicate pentahydrate and liquid sodium silicate. Sodium metasilicate pentahydrate (having the chemical formulation $Na_2SiO_3$-$5H_2O$) is also sometimes referred to as silicic acid, disodium salt pentahydrate, and disodium oxosilanediolate pentahydrate. The sodium metasilicate pentahydrate imparts alkalinity to the liquid detergent concentrate (as well as the ultimate cleaning solution using same) to aid in the neutralization of acidic soil, the deflocculation of particulate soil, and the emulsification of oils and greases. The sodium metasilicate pentahydrate further acts as an anti-redeposition agent to prevent soils from being redeposited on cleaned surfaces. Liquid sodium silicate (having the chemical formulation $Na_2Si_3O_7$) adds alkalinity to the liquid detergent concentrate (as well as the ultimate cleaning solution using same) and also acts as a corrosion inhibitor by forming a film on metal surfaces until rinsed away. In general, liquid sodium silicate is a solution of sodium silicate dissolved in water. A variety of commercially-available liquid sodium silicates comprise 30-50% by weight of sodium silicate. For purposes of the present invention, the liquid sodium silicate should have a weight ratio of silicon dioxide to sodium oxide ranging from 1.8 to 3.75.

The surfactants used in the liquid detergent concentrate are octyldimethylamine oxide, octyl iminodipropionate, and an alcohol ethoxylate having a hydrophilic-lipophilic balance (HLB) in a range of 10-12. Octyldimethylamine oxide provides good wetting, has very low foaming characteristics, and is stable in highly alkaline solutions. Octyl iminodipropionate is a non-foaming amphoteric surfactant with excellent hydrotropic properties, is very useful in solubilizing the low foaming nonionic surfactant in the liquid detergent concentrate, and is also stable in highly alkaline solutions. In some embodiments where it is desirable to reduce foaming of the ultimate aqueous cleaning solution, the alcohol ethoxylate may be undecyl alcohol ethoxylate that has a HLB of 10.9. The combination of these surfactants with the above-described highly alkaline silicates provides a liquid detergent concentrate that, when mixed in small quantities with deionized water, forms a cleaning solution capable of removing PFPE greases.

The detergent builders and surfactants are mixed in deionized water having a resistivity of at least 50,000 ohms. In some embodiments where it is desired to use small quantities of the liquid detergent concentrate (e.g., 3-5 volume percent) in the ultimate aqueous cleaning solution/system, the deionized water may have a resistivity of at least 1 megaohm. The higher the resistivity of the deionized water, the fewer charged particles contained therein. In some embodiments, the reduction of charged particles may be important since positively-charged particles will react with the negatively-charged builder molecules such that the resulting pairing will precipitate to form scale in the wash tank and reduce the performance of the ultimate cleaning solution.

Several exemplary formulations of the liquid detergent concentrate will be presented below. By way of illustrative examples, each of the following liquid detergent concentrate's formulations assumes the final product is 200 milliliters. However, it is to be understood that other volumes of the above-described liquid detergent concentrate may be used without departing form the scope of the present invention. Each of the formulations will include weights for the detergent builders and surfactants with the remaining portion of the 200 milliliter liquid detergent concentrate being deionized water.

In some embodiments, the liquid detergent concentrate has the following formulation:

15-25 grams of sodium metasilicate pentahydrate,
15-25 grams of liquid sodium silicate,
35-50 grams of octyldimethylamine oxide,
30-45 grams of octyl iminodipropionate,
15-25 grams of an alcohol ethoxylate having an HLB in the range of 10-12, and
sufficient amounts of deionized water having a resistivity of at least 50,000 ohms to create a total volume of 200 milliliters.

In some embodiments, the same weight amounts are used for each of the detergent builders as well as the alcohol ethoxylate surfactant having an HLB in the range of 10-12.

In some embodiments, a first weight amount is used for each of the detergent builders as well as the alcohol ethoxylate surfactant having an HOLB in the range of 10-12, and a second weight amount is used for the two other surfactants where the second weight amount is twice the first weight amount. For example, in some embodiments, the liquid detergent concentrate has the following formulation:

20 grams of sodium metasilicate pentahydrate,
20 grams of liquid sodium silicate,
40 grams of octyldimethylamine oxide,
40 grams of octyl iminodipropionate,
20 grams of an alcohol ethoxylate having an HLB in the range of 10-12, and
sufficient amounts of deionized water having a resistivity of at least 50,000 ohms to create a total volume of 200 milliliters.

An exemplary method for making 200 milliliters of the liquid detergent concentrate for one of the above-described formulations is as follows:

Heat 75 milliliters of deionized water with a resistivity of at least 50,000 ohms to approximately 40-50° C., and maintain this temperature range until all components have been added and dissolved.
Mix 20 grams of sodium metasilicate pentahydrate and 20 grams liquid sodium silicate into the heated deionized water.
Following dissolution of the detergent builders, mix in 40 grams of octyldimethylamine oxide, 40 grams of octyl iminodipropionate, and 20 grams of an alcohol ethoxylate having an HLB in a range of 10-12 (e.g., undecyl alcohol ethoxylate).
Continue mixing until solution is clear.
Cool to room temperature.
Mix in sufficient deionized water with a resistivity of at least 50,000 ohms to bring total solution volume to 200 milliliters.

An exemplary method for using the above-described liquid detergent concentrate in a parts cleaning application will now be described. An aqueous cleaning solution includes 3-5 volume percent of one of the above-described liquid detergent concentrate formulations mixed with deionized water having a resistivity of at least 50,000 ohms. The aqueous solution may be used at room temperature or may be heated (e.g., in a range of 50-75° C.). Heating the aqueous solution generally reduces the amount of time required for cleaning. In some embodiments, the aqueous cleaning solution may be used to fill an ultrasonic immersion wash tank with the parts to be cleaned being then immersed in the tank. In some embodiments, parts may be rotated during their time in the wash tank. In some embodiments, the aqueous cleaning solution may be applied to parts using a sprayer.

The liquid detergent concentrate and aqueous cleaning solution using same as described herein present an environmentally-safe, non-hazardous solution to the cleaning of PFPEs from parts. Sodium metasilicate pentahydrate is classified by the United States Food and Drug Administration (FDA) as "Generally Recognized as Safe" or GRAS (i.e., class of acceptable and safe food additives) for use in washing mixtures for fruits and vegetables, in sanitizing solutions on food-contact surfaces, and other uses. Sodium silicates are often used as replacements for sodium phosphates which have been banned in many locales. Octyldimethylamine oxide, octyl iminodipropionate, and alcohol ethoxylates are readily biodegradable and not listed as hazardous under current governmental regulations.

The advantages of the above-described liquid detergent concentrate are numerous. The concentrate may be used in small amounts to create an effective and environmentally-safe aqueous cleaning solution that removes PFPEs from parts. The particular formulations have been found to "roll up" the PFPEs from parts, while simultaneously preventing the PFPEs from redepositing themselves on the parts. Aqueous cleaning solutions that include the above-described liquid detergent concentrate also remove other contaminants in the same wash cycle thereby reducing the time, complexity, and expense of parts cleaning operations.

Although the methods and systems presented herein have been described for specific embodiments thereof, there are numerous variations and modifications that will be readily apparent to those skilled in the art in light of the above teachings. It is therefore to be understood that, within the scope of the appended claims, the methods and systems presented herein may be practiced other than as specifically described.

What is claimed as new and desired to be secured by Letters Patent of the United States is:

1. A liquid detergent concentrate comprising:
A) a detergent builder system consisting of:
i) sodium metasilicate pentahydrate; and
ii) liquid sodium silicate;
B) a surfactant system consisting of:
i) octyldimethylamine oxide;
ii) octyl iminodipropionate; and
iii) an alcohol ethoxylate having a hydrophilic-lipophilic balance (HLB) in a range of 10-12; and
C) deionized water having a resistivity of at least 50,000 ohms.

2. A liquid detergent concentrate as in claim 1, wherein 200 milliliters of said liquid detergent concentrate includes:

15-25 grams of said sodium metasilicate pentahydrate, 15-25 grams of said liquid sodium silicate, 35-50 grams of said octyldimethylamine oxide, 30-45 grams of said octyl iminodipropionate, and 15-25 grams of said alcohol ethoxylate.

3. A liquid detergent concentrate as in claim 1, wherein 200 milliliters of said liquid detergent concentrate includes:

20 grams of said sodium metasilicate pentahydrate, 20 grams of said liquid sodium silicate, 40 grams of said octyldimethylamine oxide, 40 grams of said octyl iminodipropionate, and 20 grams of said alcohol ethoxylate.

4. A liquid detergent concentrate as in claim 1, wherein said alcohol ethoxylate comprises undecyl alcohol ethoxylate.

5. A liquid detergent concentrate as in claim 1, wherein said deionized water has a resistivity of at least 1 megaohm.

6. A liquid detergent concentrate comprising:

A) a detergent builder system consisting of:

i) sodium metasilicate pentahydrate; and ii) liquid sodium silicate, wherein both builders are present in equal weight amounts;

B) a surfactant system consisting of:

i) octyldimethylamine oxide;

ii) octyl iminodipropionate, wherein these surfactants are present in equal weight amounts; and iii) an alcohol ethoxylate having a hydrophilic-lipophilic balance (HLB) in a range of 10-12, wherein this surfactant is present in the same weight amount as the detergent builders; and C) deionized water having a resistivity of at least 50,000 ohms.

7. A liquid detergent concentrate as in claim 6, wherein 200 milliliters of said liquid detergent concentrate includes:

15-25 grams of said sodium metasilicate pentahydrate, 15-25 grams of said liquid sodium silicate, 35-45 grams of said octyldimethylamine oxide, 35-45 grams of said octyl iminodipropionate, and 15-25 grams of said alcohol ethoxylate.

8. A liquid detergent concentrate as in claim 6, wherein 200 milliliters of said liquid detergent concentrate includes:

20 grams of said sodium metasilicate pentahydrate, 20 grams of said liquid sodium silicate, 40 grams of said octyldimethylamine oxide, 40 grams of said octyl iminodipropionate, and 20 grams of said alcohol ethoxylate.

9. A liquid detergent concentrate as in claim 6, wherein said alcohol ethoxylate comprises undecyl alcohol ethoxylate.

10. A liquid detergent concentrate as in claim 6, wherein said deionized water has a resistivity of at least 1 megaohm.

11. A liquid detergent concentrate comprising:

A) a detergent builder system consisting of:

i) a first weight amount of sodium metasilicate pentahydrate; and ii) a first weight amount of liquid sodium silicate;

B) a surfactant system consisting of:

i) a second weight amount of octyldimethylamine oxide;

ii) a second weight amount of octyl iminodipropionate, wherein the second weight amounts are twice the first weight amounts; and iii) a first weight amount of an alcohol ethoxylate having a hydrophilic-lipophilic balance (HLB) in a range of 10-12; and C) deionized water having a resistivity of at least 50,000 ohms.

12. A liquid detergent concentrate as in claim 11, wherein 200 milliliters of said liquid detergent concentrate includes:

20 grams of said sodium metasilicate pentahydrate, 20 grams of said liquid sodium silicate, 40 grams of said octyldimethylamine oxide, 40 grams of said octyl iminodipropionate, and 20 grams of said alcohol ethoxylate.

13. A liquid detergent concentrate as in claim 11, wherein said alcohol ethoxylate comprises undecyl alcohol ethoxylate.

14. A liquid detergent concentrate as in claim 11, wherein said deionized water has a resistivity of at least 1 megaohm.

* * * * *